(12) United States Patent
Debreczeni

(10) Patent No.: US 11,224,899 B2
(45) Date of Patent: Jan. 18, 2022

(54) METHOD OF DEMONSTRATING THE EFFECTIVENESS OF A CLEANING COMPOSITION

(71) Applicant: The Procter & Gamble Company, Cincinnati, OH (US)

(72) Inventor: Mate Debreczeni, Brussels (BE)

(73) Assignee: The Procter & Gamble Company, Cincinnati, OH (US)

(*) Notice: Subject to any disclaimer, the term of this patent is extended or adjusted under 35 U.S.C. 154(b) by 378 days.

(21) Appl. No.: 16/010,840

(22) Filed: Jun. 18, 2018

(65) Prior Publication Data

US 2018/0369875 A1   Dec. 27, 2018

(30) Foreign Application Priority Data

Jun. 22, 2017   (EP) ..................... 17177276

(51) Int. Cl.

| | |
|---|---|
| *B08B 3/00* | (2006.01) |
| *C11D 11/00* | (2006.01) |
| *C11D 17/00* | (2006.01) |
| *B08B 3/08* | (2006.01) |
| *C11D 1/83* | (2006.01) |
| *C11D 3/10* | (2006.01) |
| *C11D 3/30* | (2006.01) |
| *C11D 3/33* | (2006.01) |
| *C11D 1/29* | (2006.01) |
| *C11D 1/75* | (2006.01) |
| *G01N 13/02* | (2006.01) |

(52) U.S. Cl.
CPC ............. *B08B 3/003* (2013.01); *B08B 3/08* (2013.01); *C11D 1/83* (2013.01); *C11D 3/10* (2013.01); *C11D 3/30* (2013.01); *C11D 3/33* (2013.01); *C11D 11/0058* (2013.01); *C11D 17/0017* (2013.01); *C11D 1/29* (2013.01); *C11D 1/75* (2013.01); *G01N 13/02* (2013.01)

(58) Field of Classification Search
None
See application file for complete search history.

(56) References Cited

U.S. PATENT DOCUMENTS

| | | | |
|---|---|---|---|
| 2006/0094619 A1 | 5/2006 | Billman | |
| 2006/0191076 A1* | 8/2006 | Bonfa | C11D 3/0094 8/148 |
| 2011/0105377 A1* | 5/2011 | Yianakopoulos | C11D 1/72 510/365 |

FOREIGN PATENT DOCUMENTS

| | | |
|---|---|---|
| EP | 1927651 A1 | 6/2008 |
| WO | WO2012073007 A2 | 6/2012 |

(Continued)

OTHER PUBLICATIONS

Search Report; Application No. 17177276.7-1358; dated Nov. 24, 2017; 7 Pages.

*Primary Examiner* — Nicole Blan
(74) *Attorney, Agent, or Firm* — Melissa Krasovec

(57) ABSTRACT

A method for providing to a consumer a visualization of the effectiveness of coloured stain removal of a cleaning composition on a substrate comprising the steps of: providing a first substrate having a first coloured stain, treating the first coloured stain with a first cleaning composition formulated to generate a foam, allowing the generated foam to act on the first coloured stain, and allowing the consumer to visually assess effectiveness of coloured stain removal of the first cleaning composition.

13 Claims, 2 Drawing Sheets

Coloured Stain Removal Performance

(56) References Cited

FOREIGN PATENT DOCUMENTS

| WO | WO2017011190 A1 | 1/2017 |
| WO | WO2017070918 A1 | 5/2017 |

* cited by examiner

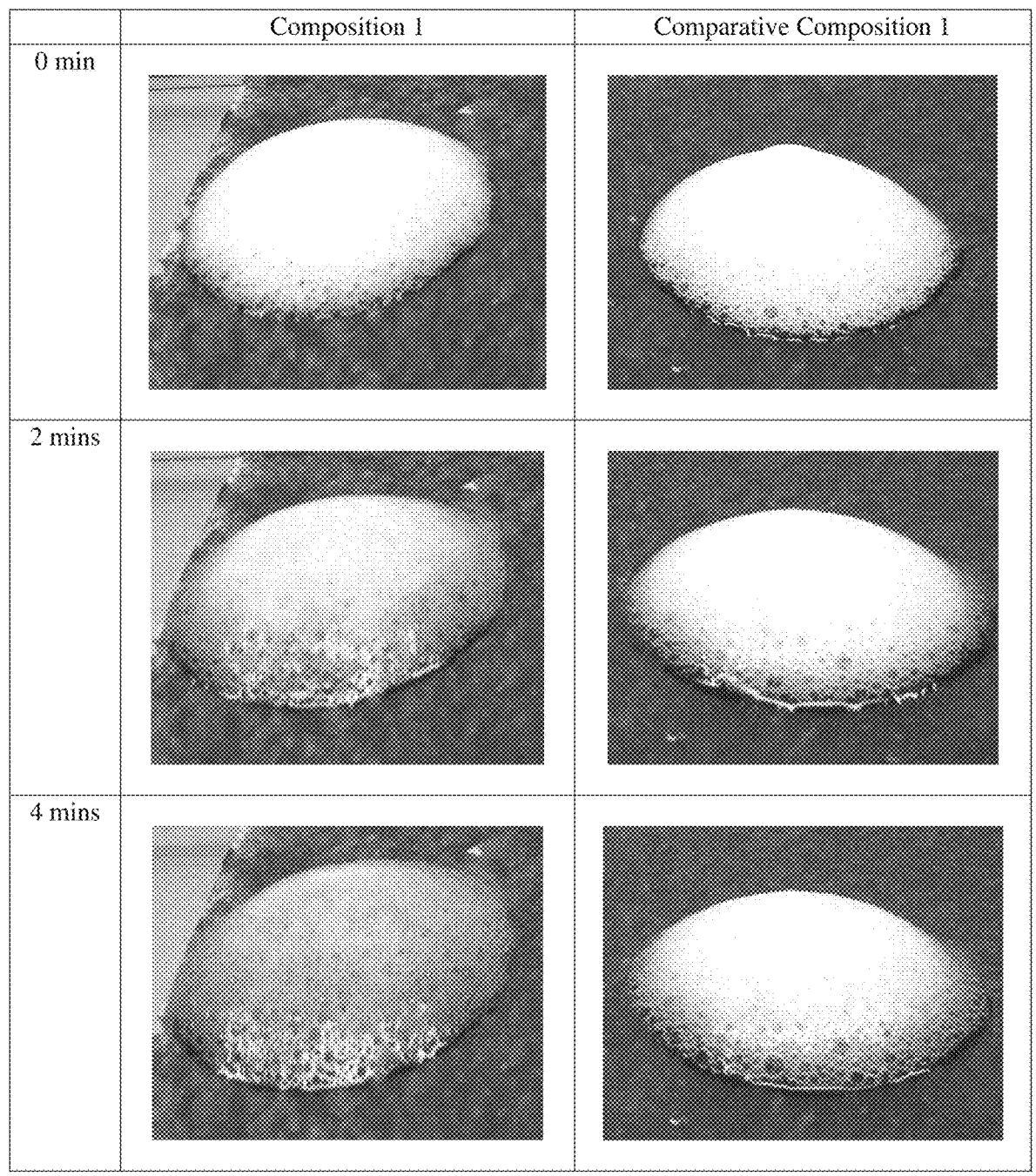
Fig. 2 – Coloured Stain Removal Performance

METHOD OF DEMONSTRATING THE EFFECTIVENESS OF A CLEANING COMPOSITION

FIELD OF THE INVENTION

This invention is directed to a method of demonstrating the performance effectiveness of a cleaning composition and generated foam compositions for use in such demonstrations.

BACKGROUND OF THE INVENTION

Consumers would like to be reassured upfront and before buying a cleaning product that it will perform effectively. Therefore, the goal of any demonstration is to convince consumers to buy the cleaning product by showing its cleaning effectiveness against the targeted task and/or its superior performance over the competition.

One key challenge that remains in the dish detergent industry is convincing consumers that their cleaning product is effective at the removal of cooked-, baked- or burnt-on coloured soil, particularly grease soils, from soiled dishware. Typically, these types of soiled dishware require long soaking times and/or heavy mechanical agitation to achieve the desired cleaning results. Unfortunately, both requirements can be difficult to incorporate into demonstrations. For example, most on air advertising copies or live in-store demonstrations last between thirty seconds to few minutes and therefore would not provide sufficient time if any substantial soaking period is needed. Additionally, it is useful if the articles used in the demonstrations are portable to various sites and require minimal space. Therefore, demonstrations that employ heavy machinery to provide the required physical agitation would not be useful. One common way to overcome these problems has been to provide time lapsed video demonstrating the treatment process with the cleaning products. However, consumers tend to regard the use of time lapsed video in demonstrations, particularly with live demonstrations, with skepticism because of the perception that they might have been doctored or visually enhanced to unfairly show the cleaning effectiveness and/or favor the demonstrator's product over the competition.

Accordingly, the need exists for a method for demonstrating to the consumers a real time viewing of the effectiveness of the composition on coloured soil removal from dishware. The need also exists for a generated foam composition, which can provide a performance signal (i.e., gradual colour change of the generated foam) to the consumers to reassure them of the cleaning efficacy of the composition.

SUMMARY OF THE INVENTION

In a first aspect, the present invention is directed to a method for providing to a consumer a visualization of the effectiveness of coloured stain removal of a cleaning composition on a substrate according to the claims.

In another aspect, the invention also relates to a generated foam composition comprising an extracted coloured soil and a cleaning composition comprising i) from 1% to 15% by weight of the composition of a surfactant system and from 1% to 15% by weight of the composition of an active selected from the group consisting of an organic grease cleaning solvent and a linear or branched low cut alcohol alkoxylate non-ionic surfactant, preferably a low cut alcohol ethoxylate non-ionic surfactant or a mixture thereof, comprising on average from about 3 to about 7 alkoxy preferably ethoxy (EO) groups, more preferably a linear C6 alcohol ethoxylate non-ionic surfactant comprising on average from about 3 to about 7 EO, preferably from about 4 to about 6 EO, more preferably about 5 EO; wherein the surfactant system described under i) excludes the low cut alcohol alkoxylate non-ionic surfactant described under ii).

In yet another aspect, the invention provides for use of a generated foam of the present invention to enhance visualization to consumer of removal of coloured stains from a substrate.

One aim of the present invention is to provide a generated foam composition and exposing this generated foam composition to a coloured cooked-, baked- or burnt-on stain such that a performance signal (i.e., colour change of the generated foam) is created to provide the consumers with a visual demonstration of the cleaning efficacy, in particular the effectiveness of coloured stain removal, of the composition.

Another aim of the present invention is to provide such a generated foam composition of the invention to be used to show the performance efficacy of an individual product, as well as enable the consumer to cross-compare efficacy of a range of products (i.e., 2 or more).

These and other features, aspects and advantages of the present invention will become evident to those skilled in the art from the detailed description which follows.

BRIEF DESCRIPTION OF THE DRAWINGS

While the specification concludes with claims particularly pointing out and distinctly claiming the invention, it is believed that the invention will be better understood from the following description of the accompanying figures in which like reference numerals identify like elements, and wherein:

FIG. 2 shows the results of the coloured stain removal test from Example 1 for a strongly performing Composition 1 compared to a poorly performing Comparative Composition 1.

DETAILED DESCRIPTION OF THE INVENTION

Figure 1:
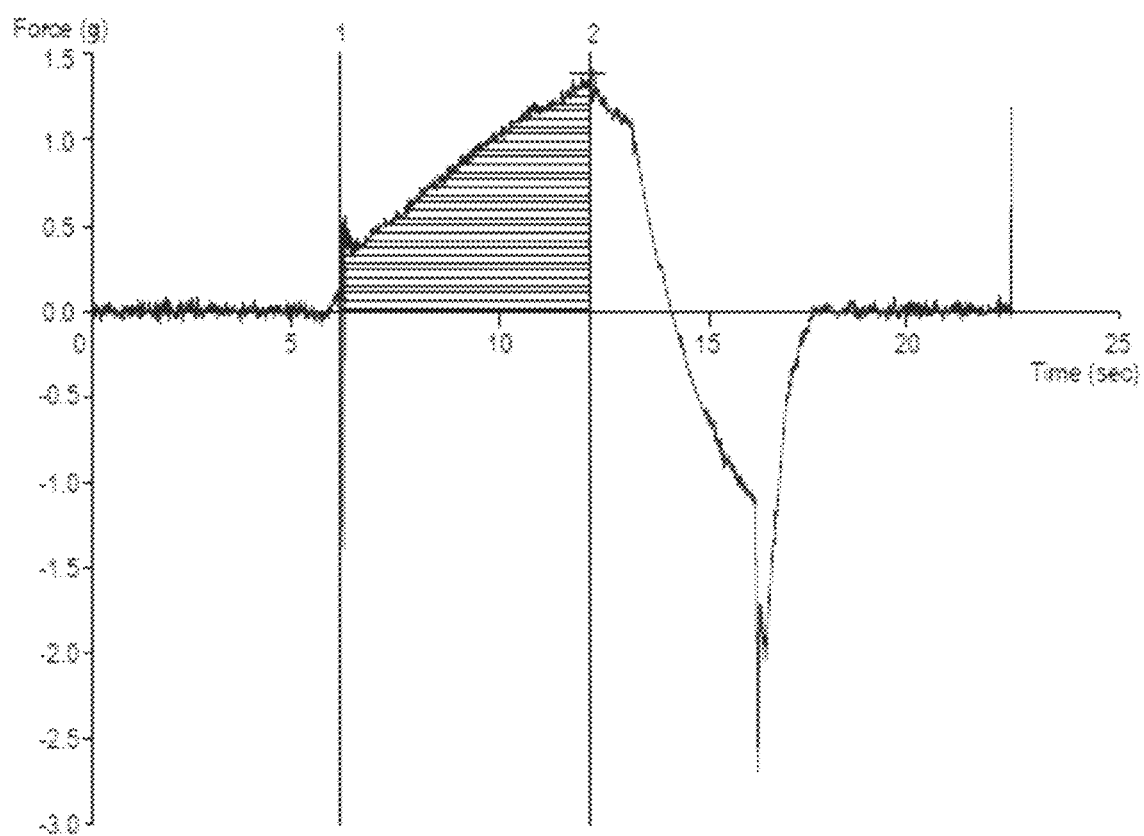
FIG. 1 is a graphical representation of compression forces for a direct-foam spray.

It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a", "an", and "the" include the plural.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "1.2 cm" is intended to mean "about 1.2 cm". As used herein, the term "about" when placed before a numerical value "X" refers to an interval extending from X minus 10% of X to X plus 10% of X, preferably to an interval extending from X minus 5% of X to X plus 5% of X, and even more preferably to an interval extending from X minus 2% of X to X plus 2% of X.

As used herein, any of the terms "comprising", "having", "containing", and "including" means that other steps, ingredients, elements, etc. which do not adversely affect the end result can be added. Each of these terms encompasses the terms "consisting of" and "consisting essentially of". Unless otherwise specifically stated, the elements and/or equipment herein are believed to be widely available from multiple suppliers and sources around the world.

As used herein, the term "consumers" is meant to include the customers who purchase the product as well as the store owners who decide whether to stock their shelves with the product. There is clearly value to the demonstrator to have both parties view the demonstration using the generated foam composition.

As used herein, the term "dishware" includes cookware and tableware made from, by non-limiting examples, ceramic, china, metal, glass, plastic (e.g., polyethylene, polypropylene, polystyrene, etc.) and wood.

The term "grease" as used herein means materials comprising at least in part (i.e., at least 0.5 wt % by weight of the grease) saturated and unsaturated fats and oils, preferably oils and fats derived from animal sources such as beef, pig and/or chicken.

It is understood that the test methods that are disclosed in the Test Methods Section of the present application must be used to determine the respective values of the parameters of Applicants' inventions as described and claimed herein.

It is understood that all percentages are by weight of the total composition, as evident by the context, unless specifically stated otherwise. All ratios are weight ratios, unless specifically stated otherwise, and all measurements are made at 25° C., unless otherwise designated.

Demonstration Method

The present invention relates to methods of demonstrating the performance effectiveness of a cleaning composition. The present methods are important to show consumers the cleaning effectiveness of a cleaning composition, for example, in removal of cooked-, baked- or burnt-on coloured soil, particularly grease soils, from soiled dishware. Applicants have also surprisingly discovered that when formulating a cleaning composition according to the present invention as a generated foam and exposing the generated foam to a cooked-, baked- or burnt-on coloured soil, a performance signal (i.e., gradual colour change of the generated foam) is created to reassure the consumers of the performance efficacy of the product.

An important aspect of the present method is the ability to demonstrate the performance efficacy of a cleaning composition in real time on a consistent basis such as when practicing the method repeatedly over relatively short time periods. Such demonstrations can be conducted in retail stores, in television commercials, in video streaming via the internet, as well as other broadcast media and other live venues. The demonstration methods of the present invention do not require a long period of time to set-up and/or complete the demonstration methods. Furthermore, the demonstration methods of the present invention are relatively easy to perform and do not require heavy machinery to complete.

In one aspect, the present invention is directed to a method for providing to a consumer a visualization of the effectiveness of coloured stain removal of a cleaning composition on a substrate, the method comprising the steps of:

(a) providing a first substrate having a first coloured stain, the substrate being selected from a hard surface or a soft surface, preferably a hard surface, preferably selected from dishware;

(b) treating the first coloured stain on the first substrate with a first cleaning composition formulated to generate a foam on the first coloured stain, preferably a light-coloured foam; preferably a white foam;

(c) allowing the generated foam to act on the first coloured stain after the treatment for a first period of time from 5 seconds to 600 seconds, preferably from 10 seconds to 300 seconds, more preferably from 20 seconds to 240 seconds, most preferably from 30 seconds to 120 seconds;

(d) allowing the consumer to visually assess effectiveness of coloured stain removal of the first cleaning composition as indicated by a first colour change in the generated foam; and (e) optionally, rinsing or wiping the generated foam from the first substrate allowing the consumer to visually assess the cleaning efficacy of the first cleaning composition.

It has been found that when the first cleaning composition comprises i) from 1% to 15% by weight of the total first cleaning composition of a surfactant system; and ii) from 1% to 15% by weight of the total first cleaning composition of an active selected from the group consisting of a an organic grease cleaning solvent and a low cut alcohol alkoxylate non-ionic surfactant, preferably a low cut alcohol ethoxylate non-ionic surfactant or a mixture thereof, comprising on average from about 3 to about 7 alkoxy preferably ethoxy (EO) groups, more preferably a linear C6 alcohol ethoxylate non-ionic surfactant comprising on average from about 3 to about 7 EO, preferably from about 4 to about 6 EO, more preferably about 5 EO; wherein the surfactant system described under i) excludes the low cut alcohol alkoxylate non-ionic surfactant described under ii), that the claimed method of demonstration is very effective in visualizing its performance strength towards coloured stain removal.

According to methods of the present invention, the generated foam in step (b) may be prepared by manual agitation according to the method described in the Test Method followed by transfer of the generated foam (e.g., pipetting) onto the coloured stain. Alternatively, the first cleaning composition is preferably applied as a generated foam on the first coloured stain through spraying or pumping action, preferably spraying. Preferably, the first cleaning composition is housed in a spray dispenser or in a foaming pump, preferably a spray dispenser. The spray dispenser comprises a housing to accommodate the first cleaning composition of the invention and the spraying means. Suitable spray dispensers include hand pump (sometimes referred to as "trigger") devices, pressurized can devices, electrostatic spray devices, etc. Preferably the spray dispenser is non-solvent propellant pressurized and the spray means are of the trigger dispensing type. The spray dispenser can be a pre-compression sprayer or an aerosol spray with a pressure control valve, both commercially available in the art. Suitable pre-compression sprayers in which a buffer mechanism to control the maximum pressure can be added include the Flairosol® spray dispenser, manufactured and sold by Afa Dispensing Group (The Netherlands) and the pre-compression trigger sprayers described in U.S. Patent Publication Nos. 2013/0112766 and 2012/0048959.

According to the methods of the present invention, a performance signal can be used to show the performance efficacy of an individual product. For example, the effectiveness of the first cleaning composition may be assessed qualitatively by visualization of a colour change in the generated foam on the surface of the substrate. Without wishing to be bound by theory, it is believed that the first colour change in the generated foam represents the coloured soil being absorbed/removed/extracted from the first demonstration substrate and into the generated foam. This performance signal reassures consumers that they are buying a product with sufficient performance efficacy to do the job.

The methods of the present invention may also comprise the additional steps of providing a second substrate that has been treated with a second product, allowing the consumers to compare the first treated substrate with the second treated substrate and visually assessing the effectiveness of the treatments based on a difference in appearance of the colour change between the first generated foam versus the dispensed second cleaning composition. Alternatively, the second product can be applied on a different area (e.g., different slots) on the first substrate. This approach might be preferred since treating on the same substrate ensures more identical coloured soil conditions are tested and extra substrate is not needed. The comparison can be performed at equal time-point after treatment with the first cleaning composition and the second cleaning composition. Preferably, the methods of the present invention further comprise the additional steps of:

(f) optionally, providing a second substrate having a second coloured stain, wherein the second substrate and the second coloured stain are substantially similar to the first substrate and the first coloured stain;

(g) treating either a different area on the first coloured stain on the first substrate or the second coloured stain on the second substrate, if present, with a second cleaning composition dispensed from a dispenser;

(h) allowing the dispensed second cleaning composition to act on the first coloured stain or the second coloured stain, if present, after the treatment for a second period of time from 5 seconds to 600 seconds, preferably from 10 seconds to 300 seconds, preferably from 20 seconds to 240 seconds, most preferably from 30 seconds to 120 seconds; and (i) allowing the consumer to visually assess effectiveness of coloured stain removal between the first cleaning composition and the second cleaning composition as indicated by a different appearance of the colour change in the generated foam versus the dispensed second cleaning composition.

Preferably, the effectiveness of coloured stain removal is determined by visually assessing the different appearance of intensity of the colour change, or distribution of the colour change across the generated foam versus the dispensed second cleaning composition at an equal exposure time point.

Alternatively, the methods of the present invention may also comprise the additional steps of providing a second substrate that has been treated with a second product, allowing the consumers to compare the first treated substrate with the second treated substrate and visually assessing the effectiveness of the treatments based on a difference in time it takes the dispensed second cleaning composition to appear substantially similar to the colour change in the first generated foam. In other words, this approach assesses the difference in time it takes to reach substantially similar appearance of the colour change between the dispensed second cleaning composition versus the first generated foam. Alternatively, the second product can be added on a different area (e.g., different slots) on the first substrate. Preferably, the methods of the present invention further comprise the additional steps of:

(f) optionally, providing a second substrate having a second coloured stain, wherein the second substrate and the second coloured stain are substantially similar to the first substrate and the first coloured stain;

(g) treating either a different area on the first coloured stain on the first substrate or the second coloured stain on the second substrate, if present, with a second cleaning composition dispensed from a dispenser;

(h) allowing the dispensed second cleaning composition to act on the first coloured stain or the second coloured stain, if present, after the treatment for a second period of time until the dispensed second cleaning composition is substantially similar in appearance to the colour change in the generated foam of the first composition and recording the duration of the second period of time; and (i) allowing the consumer to visually assess effectiveness of coloured stain removal between the first cleaning composition and the second cleaning composition as indicated by a difference in the duration of the first period of time versus the second period of time.

In another aspect, the present invention is directed to a method for providing to a consumer a visualization of the effectiveness of coloured stain removal of a cleaning composition on a substrate, the method comprising the steps of may also comprise the steps of:

(a) providing a first substrate having a first coloured stain, the substrate being selected from a hard surface or a soft surface, preferably a hard surface, preferably selected from dishware;

(b) treating a first area on the first coloured stain on the first substrate with a first cleaning composition formulated to generate a foam on the first coloured stain, preferably a light-coloured foam; preferably a white foam;

(c) treating a second area on the first coloured stain on the first substrate with a second cleaning composition;

(d) allowing the treatments of steps (b) and (c) to act on the first coloured stain for a period of time from 5 seconds to 600 seconds, preferably from 10 seconds to 300 seconds, more preferably from 20 seconds to 120 seconds, most preferably from 30 seconds to 120 seconds; and (e) rinsing or wiping the compositions from the first substrate and allowing the consumer to visually assess the cleaning efficacy by cross-comparing the remaining coloured stains. Alternatively, steps (c) and (e) can be executed on a similar second substrate.

It has been found that when the first cleaning composition comprises i) from 1% to 15% by weight of the total first cleaning composition of a surfactant system; and ii) from 1% to 15% by weight of the total first cleaning composition of an active selected from the group consisting of an organic grease cleaning solvent and a low cut alcohol alkoxylate non-ionic surfactant, preferably a low cut alcohol ethoxylate non-ionic surfactant or a mixture thereof, comprising on average from about 3 to about 7 alkoxy preferably ethoxy (EO) groups, more preferably a linear C6 alcohol ethoxylate non-ionic surfactant comprising on average from about 3 to about 7 EO, preferably from about 4 to about 6 EO, more preferably about 5 EO; wherein the surfactant system described under i) excludes the low cut alcohol alkoxylate non-ionic surfactant described under ii), that the claimed method of demonstration is very effective in visualizing its performance strength towards coloured stain removal compared to inferior formulations not having these technology bricks.

Preferably, the surfactant system of the first cleaning composition comprises an anionic surfactant, preferably a sulfate or sulfonate or sulfosuccinate anionic surfactant, more preferably a sulfate anionic surfactant, even more preferably an alkyl ethoxylated sulfate anionic surfactant, most preferably having an average degree of ethoxylation of from 0.5 to 5, preferably from 0.5 to 3, and a co-surfactant selected from the group consisting of amphoteric surfactant, zwitterionic surfactant and mixtures thereof, preferably the co-surfactant is an amphoteric surfactant, most preferably comprising amine oxide surfactant. The surfactant system preferably is present from 5% to 15%, more preferably from 7% to 12% by weight of the first cleaning composition.

The first cleaning composition of the invention preferably further comprises from 0.01% to 5% by weight of the first cleaning composition of an organic solvent selected from the group consisting of C2-C4 alcohols, C2-C4 polyols, poly alkylene glycol and mixtures thereof. Without wishing to be bound by theory, these solvents are believed to improve physical stability of the overall composition, as well as controlling the rheology to maintain the product sprayable.

Preferably, the organic grease cleaning solvent of the first cleaning composition is selected from the group consisting of:
(a) a glycol ether solvent selected from the group consisting of glycol ethers of Formula (I): R1O(R2O)nR3, Formula (II): R4O(R5O)nR6, and mixtures thereof; wherein:
  R1 is a linear or branched C4, C5 or C6 alkyl or a substituted or unsubstituted phenyl;
  R2 is ethyl or isopropyl;
  R3 is hydrogen or methyl, and n is 1, 2 or 3;
  R4 is n-propyl or isopropyl;
  R5 is isopropyl;
  R6 is hydrogen or methyl and n is 1, 2 or 3;
(b) an ester selected from the group consisting of:
  i) monoesters of the Formula (III): R7C=OOR8, wherein:
    R7 is a linear or branched C1 to C4 alkyl; and C8 is a linear or branched C2 to C8 alky;
  ii) di- or tri-esters having the Formula (IV): R9(C=OOR10), wherein:
    R9 is a saturated or unsaturated C2 to C4 alkyl;
    R10 is independently selected from from a linear or branched C2 to C8 alkyl; and n is 2 or 3;
  iii) benzylbenzoate; and
  iv) mixtures thereof;
(c) an alcohol selected from the group consisting of C4-C6 linear mono-alcohols, branched C4-C10 mono-alcohols having one or more C1-C4 branching groups, alkyl mono-glycerols, and mixtures thereof; and
(d) mixtures thereof;
wherein the surfactant system and the organic grease cleaning solvent selected form (a), (b), (c) and (d) are in a weight ratio of from 5:1 to 1:5, preferably of from 5:1 to 1:1, more preferably of from 3:1 to 1:1. Preferably the organic grease cleaning solvent is selected from the glycol ether solvents described under Formulae (I) or (II) per above.

Alternatively, the organic grease cleaning solvent of the first cleaning composition is selected from the group consisting of:
(a) a glycol ether solvent selected from the group consisting of glycol ethers of Formula (V): R11O(R12O)pR13, Formula (VI) R14O(R15O)qR16, and mixtures thereof;
wherein:
  R11 is methyl or ethyl;
  R12 is ethyl or isopropyl;
  R13 is hydrogen or methyl, preferably hydrogen;
  R14 is n-propyl or isopropyl, preferably n-propyl;
  R15 is ethyl; R16 is hydrogen or methyl, preferably hydrogen;
  p is 1, 2 or 3, preferably 1 or 2; and
  q is 1, 2 or 3, preferably 1 or 2.

Preferably, the glycol ether solvent is selected from the group consisting of ethylene glycol monohexyl ether, propylene glycol n-butyl ether, dipropylene glycol n-butyl ether, ethylene glycol monobutyl ether, dipropylene glycol n-propyl ether, propylene glycol methyl ether, dipropylene glycol methyl ether, ethylene glycol mono-n-propyl ether and mixtures thereof, preferably ethylene glycol monohexyl ether, propylene glycol n-butyl ether, dipropylene glycol n-butyl ether, ethylene glycol monobutyl ether, dipropylene glycol n-propyl ether, and mixtures thereof, most preferably ethylene glycol monohexyl ether, propylene glycol n-butyl ether, dipropylene glycol n-butyl ether, and mixtures thereof.

Suitable glycol ether solvents can be purchased from The Dow Chemical Company, more particularly from the E-series (ethylene glycol based) Glycol Ethers and the P-series (propylene glycol based) Glycol Ethers line-ups. Suitable glycol ethers include: Hexyl Cellosolve™ Dowanol™ PnB, Dowanol™ DPnB, Butyl Cellosolve™, Dowanol™ DPnP, Dowanol™ PM, Dowanol™ DPM, Propyl Cellosolve™ and mixtures thereof.

Preferably the first composition comprises from 1% to 15%, preferably from 1.5% to 10%, more preferably from 2% to 8%, most preferably from 3% to 7% by weight of the composition of the organic grease cleaning solvent.

Alternatively the first composition also comprises from 1% to 15%, preferably from 1.5% to 10%, more preferably from 2% to 8%, most preferably from 3% to 7% by weight of the composition of a non-ionic surfactant selected from low cut alcohol alkoxylate non-ionic surfactant, preferably low cut alcohol ethoxylate surfactant or mixtures thereof, more preferably a C6 alcohol ethoxylate surfactant, preferably comprising on average from about 1 to about 10 EO, preferably from about 3 to about 8, preferably from about 4 to about 6, most preferably about 5. Low cut alcohol ethoxylate surfactants include alcohol ethoxylate surfactants with an average alkyl carbon chain length of C10 and below. The alkyl chain can be linear or branched and originating from a natural or synthetically derived alcohol. Suitable non-ionic alcohol ethoxylate surfactants include commercially available materials such as Emulan® HE50 or Lutensol® CS6250 (available from BASF).

Preferably, the first cleaning composition further comprises from 0.5% to 10%, preferably from 1% to 5%, more preferably from 1.5% to 3% by weight of the first cleaning composition of a hydrotrope selected from the group consisting of sodium cumene sulphonate, sodium toluene sulphonate, sodium xylene sulfonate and mixtures thereof, preferably sodium cumene sulphonate.

Preferably, the first cleaning composition of the invention further comprises from 0.01% to 5%, preferably from 0.03% to 3%, more preferably from 0.05% to 1%, most preferably from 0.07% to 0.5% by weight of the first cleaning composition of a thickening agent, preferably the thickening agent is selected from the group consisting of polyethylene glycol, polyalkylene oxide, polyvinyl alcohol, polysaccharide and mixtures thereof, preferably polysaccharides, preferably xanthan gum.

The first cleaning composition of the invention preferably further comprises a chelant, preferably an aminocarboxylate chelant, more preferably a salt of glutamic-N,N-diacetic acid (GLDA). GLDA (salts and derivatives thereof) is especially preferred according to the invention, with the tetrasodium salt thereof being especially preferred. The aminocarboxylate not only act as a chelant but also contributes to the reserve alkalinity, this seems to help with the cleaning of cooked-, baked- and burnt-on soils. Preferably, the chelant is present at a level of from 0.1% to 10%, preferably from 0.2% to 5%, more preferably from 0.2% to 3%, most preferably from 0.5% to 1.5% by weight of the first cleaning composition.

The first cleaning composition of the invention preferably further comprises a builder, preferably citrate. The builder, when present, is preferably present at the level of from 0.01% to 5%, more preferably from 0.05% to 1% by weight of the first cleaning composition. The builder also contributes to the reserve alkalinity.

The first cleaning composition of the invention preferably further comprises a bicarbonate. The bicarbonate, when present, is preferably present at the level of from 0.01% to 5%, more preferably from 0.025% to 1%, most preferably from 0.05% to 0.5% by weight of the first cleaning composition.

The first cleaning composition of the invention preferably further comprises an alkanol amine, preferably monoethanol amine. The alkanol amine, when present, is preferably present at the level of from 0.1% to 10%, more preferably from 0.2% to 5%, most preferably 0.3% to 1% by weight of the first cleaning composition.

Preferably, the first cleaning composition has a pH range of from 7 to 14, preferably from 8 to 13, preferably from 9 to 12.5, preferably from 11 to 12 as measured neat at 20° C. Preferably, the first cleaning composition has a reserve alkalinity of from 0.1 to 0.3. Reserved alkalinity is defined as the grams of NaOH per 100 mL of composition required to titrate the test composition at pH 10 to come to the test composition pH. The pH and the reserve alkalinity can contribute to the cleaning of tough food soils.

The first cleaning composition of the invention can be Newtonian or non-Newtonian. When Newtonian the first cleaning composition preferably has a viscosity of from 1 mPa·s to 50 mPa·s, preferably from 1 mPa·s to 20 mPa·s, more preferably from 1 mPa·s to 10 mPa·s at 20° C., as measured using the method defined herein Alternatively, the first cleaning composition of the invention can be a shear thinning fluid. This is important to allow the first cleaning composition to be easily sprayed. Especially suitable are first cleaning compositions having a high shear viscosity at 20° C. of from 1 mPa·s to 50 mPa·s, preferably from 1 mPa·s to 20 mPa·s, more preferably of from 5 mPa·s to 15 mPa·s at $1{,}000\ s^{-1}$, and a low shear viscosity at 20° C. of from 100 mPa·s to 1000 mPa·s, preferably of from 200 mPa·s to 500 mPa·s at $0.1\ s^{-1}$, as measured using the method defined herein.

The first cleaning composition of the present invention preferably comprises water. The water may be added to the first cleaning composition directly or may be brought into the first cleaning composition with raw materials. In any event, the total water content of the first cleaning composition herein may comprise from about 30% to about 95%, preferably from about 40% to about 90%, more preferably from about 50% to about 85% by weight of the total first cleaning composition.

The first cleaning composition herein may optionally comprise a number of other adjunct ingredients such as conditioning polymers, cleaning polymers, surface modifying polymers, soil flocculating polymers, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike).

Demonstration substrates suitable for use in the present methods include, but are not limited to hard surface or soft surface. The demonstration substrate may be made of melamine, plastic, glass, metal, ceramic, vinyl, wood, coated concrete and other materials that can retain the grease soils for at least the duration of the demonstration method. Non-limiting examples of hard surface includes dishware such as plates, trays, casserole dishes, bowls, pots, pans and the like. Non-limiting examples of soft surface includes textiles and the like. The demonstration substrate may cover a relatively small area, for example, an area of about 10 inches to about 20 inches in diameter.

The coloured stain on the dishware is cooked-, baked- or burnt-on coloured soil, preferably selected from oil, grease, coffee, tea, vegetables, tomatoes, or mixtures thereof. The coloured soil may be distributed across the demonstration substrate at a level of less than 50 mL per square inch, or from 1 mL per square inch to 25 mL per square inch. If appropriate, the coloured soil can be dispersed onto the demonstration substrate by pouring from a bottle or using a large pipette and then distributing the soil to the substrate surface by releasing the soil from the pipette. The coloured soil is allowed to dry (e.g., at room temperature) on the demonstration substrate or can be baked on. The coloured soil can be pre-formed on the demonstration substrate in advance of the day for which the demonstration method is to be performed.

Once the coloured soil dispersion has formed on the demonstration surface, the cleaning composition can be dispersed onto the coloured soil to absorb/remove/extract the coloured soil from the substrate. Preferably, according to the present methods, a first cleaning composition is dispensed as a foam, preferably sprayed, onto a first substrate to generate a foam on the first substrate. Alternatively, when there are two or more cleaning compositions being assessed, then the second cleaning composition is dispensed from a dispenser onto a second substrate or onto a second area on the first substrate. Preferably the first substrate and the second substrate, if present, contains the same and/or substantially similar coloured stain. The second cleaning composition forms a dispensed second cleaning composition on the second substrate. Alternatively, it is also possible that the same substrate is used and that the two or more products are dispensed on two or more different locations on the same substrate.

The cleaning compositions may be added onto the coloured soil dispersions by dispensing from 0.1 mL to 10 mL, or from 1 mL to 5 mL from a bottle. Preferably, the first cleaning composition forms a circular shape generated foam covering the first coloured soil dispersion. Preferably, the second cleaning composition, if present, forms a substantially similar circular shape to the generated foam of the first cleaning composition of the dispensed second cleaning composition. The generated foam and/or dispensed second cleaning composition may cover a relatively small area of the coloured soil dispersions, a substantial portion of the coloured soil dispersions or the entire area of the coloured soil dispersions for example, an area of from 0.1 inches to 10 inches in diameter.

According to the method of the present invention, the cleaning compositions may be analyzed onto the coloured soil dispersions after a wait time of from 5 seconds to 600 seconds, preferably from 10 seconds to 300 seconds, more preferably from 20 seconds to 240 seconds, most preferably from 30 seconds to 120 seconds. Preferably, the first cleaning composition is formulated to generate a foam, preferably a light-coloured foam, preferably a white foam, which is then applied on the first coloured stain. The generated foam from the first cleaning composition changes colour to show that the first coloured soil dispersion has been absorbed/removed/extracted from the first demonstration substrate surface. Preferably, the first colour change is selected from a white colour to a red colour, from a white colour to an orange colour, from a white colour to a yellow colour, from a white colour to a brown colour, or from a white colour to a black colour.

The first cleaning composition may comprise a colourant to enhance the ability of the consumer to observe the colour change from the first coloured stain that is being absorbed/removed/extracted from the first demonstration substrate. Colourants may be important to better display the removal of the first coloured soil from the first demonstration substrate. Suitable examples of colourants are commercially available from Harcross Pigments, Inc., Bayer Corporation, Reckitts Colour Ltd., Mallinckrodt Baker Inc., and DuPont Corp.

The second (or further comparative) composition(s) might have the same or different starting colour from the generated foam of the first cleaning composition, preferably the same starting colour, preferably a white colour, after application on the second (or further comparative) soiled substrate. Preferably, the second (or further comparative) composition(s) will also be present as a foam on the second (or further comparative) soiled surface. Alternatively, the second (or further comparative) composition(s) will also be present as a foam on the second (or further) slots on the same first substrate. Preferably, the first (or further comparative) colour change is selected from a white colour to a red colour, from a white colour to an orange colour, from a white colour to a yellow colour, from a white colour to a brown colour, or from a white colour to a black colour.

According to the method of the present invention, the generated foam from the first cleaning composition comprises a compression force from about 1.5 gf*mm to about 6 gf*mm, preferably from about 2 gf*mm to about 5 gf*mm, more preferably from about 2.6 gf*mm to about 4.3 gf*mm Foams comprising a compression force within the desired range will cover sufficient surface area upon spraying while having a sufficient dense appearance to be able to observe colour absorbance differences. Foams with a too low compression force will have a too dilute appearance to notice colour differences, while foams having a too high compression force will solely cover a small contact area with the surface to be cleaned, slowing down and minimizing the amount of soil that can be absorbed, and/or minimizing the ability to notice colour changes between products accordingly.

The present invention further encompasses a demonstration kit for demonstrating the performance efficacy of a first cleaning composition, the kit comprising: (a) at least one coloured soil; (b) at least one cleaning composition to be demonstrated, preferably a first cleaning composition as described herein; (c) optionally, a demonstration substrate, as described herein; (d) optionally, a measuring device such as a large pipette, or dispenser; (e) optionally, a spatula or similar implement; and (f) optionally, a timer. The kit may further comprise a set of instructions comprising instructions to demonstrate the performance efficacy of the cleaning composition by carrying out the steps of the method as described herein.

Generated Foam Composition

In another aspect, the present invention also relates to a generated foam composition comprising an extracted coloured soil and a cleaning composition comprising i) from 1% to 15% preferably from 5% to 15%, more preferably from 7% to 12% by weight of the total cleaning composition of a surfactant system and ii) from 1% to 15% preferably from 1.5% to 10%, more preferably from 2% to 8%, most preferably from 3% to 7% by weight of the total cleaning composition of an organic grease cleaning solvent and/or a linear or branched low cut alcohol alkoxylate non-ionic surfactant, preferably a low cut alcohol ethoxylate non-ionic surfactant or a mixture thereof, comprising on average from about 3 to about 7 alkoxy preferably ethoxy (EO) groups, more preferably a linear C6 alcohol ethoxylate non-ionic surfactant comprising on average from about 3 to about 7 EO, preferably from about 4 to about 6 EO, more preferably about 5 EO; wherein the surfactant system described under i) excludes the low cut alcohol alkoxylate non-ionic surfactant described under ii).

Preferably, the generated foam composition of the present invention comprises a surfactant system wherein the surfactant system comprises an anionic surfactant, preferably a sulfate or sulfonate or a sulfosuccinate surfactant, more preferably a sulfate anionic surfactant, even more preferably an alkyl ethoxylated sulfate anionic surfactant, most preferably having an average degree of ethoxylation of from 0.5 to 5, preferably from 0.5 to 3, and a co-surfactant selected from the group consisting of amphoteric surfactant, zwitterionic surfactant and mixtures thereof, preferably the co-surfactant is an amphoteric surfactant, most preferably comprising amine oxide surfactant.

Preferably, the generated foam composition of the present invention comprises an organic grease cleaning solvent wherein the organic grease cleaning solvent is selected from the group consisting of:
  (a) a glycol ether solvent selected from the group consisting of glycol ethers of Formula (I): R1O(R2O)nR3, Formula (II): R4O(R5O)nR6, and mixtures thereof; wherein:
    R1 is a linear or branched C4, C5 or C6 alkyl or a substituted or unsubstituted phenyl;
    R2 is ethyl or isopropyl;
    R3 is hydrogen or methyl, and n is 1, 2 or 3;
    R4 is n-propyl or isopropyl;
    R5 is isopropyl;
    R6 is hydrogen or methyl; and n is 1, 2 or 3;
  (b) an ester selected from the group consisting of:
    i) monoesters of the Formula (III): R7C=OOR8, wherein:
      R7 is a linear or branched C1 to C4 alkyl; and
      C8 is a linear or branched C2 to C8 alky;
    ii) di- or tri-esters having the Formula (IV): R9(C=OOR10), wherein:
      R9 is a saturated or unsaturated C2 to C4 alkyl;
      R10 is independently selected from from a linear or branched C2 to C8 alkyl; and n is 2 or 3;
    iii) benzylbenzoate; and
    iv) mixtures thereof;
  (c) an alcohol selected from the group consisting of C4-C6 linear mono-alcohols, branched C4-C10 mono-alcohols having one or more C1-C4 branching groups, alkyl mono-glycerols, and mixtures thereof; and
  (d) mixtures thereof;
  wherein the surfactant system and the organic grease cleaning solvent selected form (a), (b), (c) and (d) are in a weight ratio of from 5:1 to 1:5, preferably from 5:1 to 1:1, more preferably from 3:1 to 1:1. Preferably the organic grease cleaning solvent is a glycol ether solvent selected from Formulae (I) or (II).

Alternatively, the generated foam composition of the present invention comprises an organic grease cleaning solvent wherein the organic grease cleaning solvent is selected from the group consisting of:
 (a) a glycol ether solvent selected from the group consisting of glycol ethers of Formula (V): R11O(R12O) pR13, Formula (VI) R14O(R15O)qR16, and mixtures thereof;
wherein:
R11 is methyl or ethyl;
R12 is ethyl or isopropyl;
R13 is hydrogen or methyl, preferably hydrogen;
R14 is n-propyl or isopropyl, preferably n-propyl;
R15 is ethyl; R16 is hydrogen or methyl, preferably hydrogen;
p is 1, 2 or 3, preferably 1 or 2; and
q is 1, 2 or 3, preferably 1 or 2.

Preferably, the glycol ether solvent is selected from the group consisting of ethylene glycol monohexyl ether, propylene glycol n-butyl ether, dipropylene glycol n-butyl ether, ethylene glycol monobutyl ether, dipropylene glycol n-propyl ether, propylene glycol methyl ether, dipropylene glycol methyl ether, ethylene glycol mono-n-propyl ether and mixtures thereof, preferably ethylene glycol monohexyl ether, propylene glycol n-butyl ether, dipropylene glycol n-butyl ether, ethylene glycol monobutyl ether, dipropylene glycol n-propyl ether, and mixtures thereof, most preferably ethylene glycol monohexyl ether, propylene glycol n-butyl ether, dipropylene glycol n-butyl ether, and mixtures thereof.

Suitable glycol ether solvents can be purchased from The Dow Chemical Company, more particularly from the E-series (ethylene glycol based) Glycol Ethers and the P-series (propylene glycol based) Glycol Ethers line-ups. Suitable glycol ethers include: Hexyl Cellosolve™, Dowanol™ PnB, Dowanol™ DPnB, Butyl Cellosolve™, Dowanol™ DPnP, Dowanol™ PM, Dowanol™ DPM, Propyl Cellosolve™ and mixtures thereof.

Alternatively the generated foam composition comprises from 1% to 15%, preferably from 1.5% to 10%, more preferably from 2% to 8%, most preferably from 3% to 7% by weight of the composition of a non-ionic surfactant selected from low cut alcohol alkoxylate non-ionic surfactant, preferably low cut alcohol ethoxylate surfactant or mixtures thereof, more preferably a C6 alcohol ethoxylate surfactant, preferably comprising on average from about 1 to about 10 EO, preferably from about 3 to about 8, preferably from about 4 to about 6, most preferably about 5. Low cut alcohol ethoxylate surfactants include alcohol ethoxylate surfactants with an average alkyl carbon chain length of C10 and below. The alkyl chain can be linear or branched and originating from a natural or synthetically derived alcohol. Suitable non-ionic alcohol ethoxylate surfactants include commercially available materials such as Emulan® HE50 or Lutensol® CS6250 (available from BASF).

In another aspect, the present invention relates to the use of a generated foam composition as described herein to enhance visualization to consumer of removal of coloured stains from a substrate.

Preferably, the use involves a generated foam composition having:
 (a) a compression force from about 1.5 gf*mm to about 6 gf*mm, preferably from about 2 gf*mm to about 5 gf*mm, more preferably from about 2.4 gf*mm to about 4.3 gf*mm;
 (b) an average foam density of from about 0.04 g/mL to about 0.5g/mL, preferably from about 0.06g/mL to about 0.4 g/ml, more preferably from about 0.08 g/mL to 0.3 g/mL; and
 (c) a visualization area from 1 cm$^2$ to 100 cm$^2$, preferably from 3 cm$^2$ to 75 cm$^2$, preferably from 5 cm$^2$ to 50 cm$^2$, or preferably from 10 cm$^2$ to 30 cm$^2$.

Preferably, the use of the generated foam composition of the present invention comprises a compression force from about 1.5 gf*mm to about 6 gf*mm, preferably from about 2 gf*mm to about 5 gf*mm, more preferably from 2.6 gf*mm to 4.3 gf*mm wherein the compression force is maintained for at least 10 seconds, preferably at least 30 seconds, preferably at least 60 seconds, preferably at least 120 seconds, or preferably at least 180 seconds.

Preferably, the use of the generated foam composition according to the present invention, wherein the use applies the generated foam to a substrate having a pre-deposited coloured stain, wherein the generated foam changes colour after exposure to the pre-deposited coloured stain on the substrate.

Test Methods

The following assays set forth must be used in order that the invention described and claimed herein may be more fully understood.

Test Method 1: Reserve Alkalinity

The reserve alkalinity for a solution is determined in the following manner A pH meter (for example An Orion® Model 720A from Thermo Scientific) with a Ag/AgCl electrode (for example an Orion sure flow Electrode model 9172BN) is calibrated using standardized pH 7 and pH 10 buffers. A 100 g of a 10% solution in distilled water at 20° C. of the composition to be tested is prepared. The pH of the 10% solution is measured and the 100 g solution is titrated down to pH 10 using a standardized solution of 0.1 N of HCl. The volume of 0.1 N HCl required is recorded in mL. The reserve alkalinity is calculated as follows:

Reserve Alkalinity=mL=0.1N HCl×0.1 (equivalent/liter)×Equivalent weight NaOH (g/equivalent)×10

Test Method 2: Viscosity

The rheology profile is measured using a "TA instruments DHR1" rheometer, with a flat steel Peltier plate and a 60 mm, 2.026° cone plate geometry (TA instruments, serial number: SN960912). The flow curve procedure includes a conditioning step and a flow sweep step at 20° C. The conditioning step comprises a 10 seconds soaking step at 20° C., followed by a 10 seconds pre-shear step at 10 s$^{-1}$ at 20° C., followed by a 30 seconds zero shear equilibration step 20° C. The flow sweep step comprises a logarithmical shear rate increase from 0.01 s$^{-1}$ to 3,000 s$^{-1}$ at 20° C., with a 10 points per decade acquisition rate, a maximum equilibration time of 200 seconds, a sample period of 15 seconds and a tolerance of 3%.

When measuring shear thinning product compositions the high shear viscosity is defined at a shear rate of 1,000 s$^{-1}$, and the low shear viscosity at a shear rate of 0.1 s$^{-1}$. For Newtonian product compositions the shear rate at 1,000 s$^{-1}$ is recorded.

Test Method 3: Compression Force

The characteristic defined herein as the Compression Force is measured on samples of foam generated from the cleaning composition and spray device being tested. The compression force of a direct-foam composition may be measured by the following test method.

A texture analyzer (model TA.XT plus) is provided by Stable Micro Systems Ltd. (Godalming, Surrey, UK). The data is analyzed by Texture Exponent software (Version 6.0, Build 6, Issue 0) also provided by Stable Micro Systems Ltd. For purposes of this testing, the instrument is configured with an aluminum probe having a cylindrical shape with smooth surfaces. The bottom surface of the probe has a diameter of 22 mm; the probe height is 3 mm.

A foam sample is collected in a 100 mL polypropylene conical titration container with an upper inside diameter of 5.2 cm, a bottom inside diameter of 3.2 cm and a height of 9.0 cm, (container series #101974) available from Mettler-Toledo International Inc. (Columbus, Ohio, U.S.A.). To collect the foam sample, the nozzle of the spray dispenser is placed at the top edge of the conical titration container and sprayed downwards towards the inside bottom of the container. Spraying is continuously repeated, with full actuation and release of the trigger for each spray and no waiting time after each stream of spray ends, until the total volume of the foam product inside the conical titration container is about 40 ml, including the foam and the liquid drainage from the foam.

Measurements of compression force vs. compression time are performed immediately after the foam is generated, following the macro setting shown in Table 1. The compression work is calculated as the integration of normal force times distance when the probe is going down in the unit of gf*mm following Table 2.

The following sequence and macro setting is programmed on the instrument to conduct the measurement.

TABLE 1

| N | Caption | Value | Type | Comment | Display condition |
|---|---|---|---|---|---|
| 0 | <reserved> | 0 | <reserved> | | Never |
| 1 | Tension/compression | 1 = compression | List | Used to set tension/compression mode | Always |
| 2 | | 10 mm/sec | Speed | Used for stage 3/stage 8 | Never |
| 3 | | 0.5 g | Force | Used for stage 3 | Never |
| 4 | | 0.5 mm/sec | Speed | Used for stage 5 | Never |
| 5 | | 3 mm | Distance | Used for stage 5 | Never |
| 6 | | 1 sec | Time | Used for stage 6 | Never |
| 7 | | 1 mm/sec | Speed | Used for stage 7 | Never |
| 8 . . . 245 | | N/A | <spare> | | Never |
| 246 | | 0 mm | Distance | Used for position memory 2 | Never |
| 247 | | 0 mm | Distance | Used for position memory 1 | Never |
| 248 | | 0 | Miscellaneous | Used for temporary register | Never |
| 249 | | 0 | Miscellaneous | Used for temporary register | Never |

The following sequence and macro setting is programmed on the instrument to conduct the analysis. The force area between two time points is calculated (see FIG. 1, Compression Force area calculation).

TABLE 2

| | Program | Flags |
|---|---|---|
| 1 | Clear graph results | |
| 2 | Redraw | |
| 3 | Search Forwards | |
| 4 | Go to time 5 seconds | |
| 5 | Go to force 0.2 g | |
| 6 | Drop anchor | |
| 7 | Go to peak +ve value distance | |
| 8 | Drop anchor | |
| 9 | Area (Active vs Active) | R |

The Compression Force test method is conducted in triplicate for each product being tested, in a room having an air temperature of 23° C.+/−2° C. and 50%+/−10% relative humidity ("RH"), while being protected from air currents. The reported Compression Force of a product is the average value from the replicate samples tested.

Test Method 4: Foam Density

The characteristic defined herein as the "Foam Density" is measured on samples of foam generated from the first cleaning composition being tested.

The test is performed at an ambient temperature of 21° C.+/−2° C. and a RH of 40% to 60%, while being protected from air currents.

A foam sample is collected in a 250 mL glass beaker having a 200 mL volume mark.

The weight of the glass beaker is measured and recorded prior to the test.

To collect the foam product sample, the sprayer nozzle of the dispenser containing the product is placed in contact with and at the top edge of the glass beaker. The composition is sprayed downwards into the bottom of the glass beaker. With the help of a timer, the composition is sprayed downwards at a pace of two sprays per second until the height of the sprayed foam product in the beaker reaches the 200 mL volume mark. The combined weight of the beaker and the foam product is immediately measured, and the initial beaker weight is subtracted to determine the weight of the foam product therein.

The foam density is calculated as the weight of the foam product within the beaker (in grams) divided by 200 mL.

The test is repeated in triplicate and the average value from the three replicates is reported as the Foam Density, in units of g/mL.

Test Method 5: Coloured Stain Removal Test

The objective of the coloured stain removal test is to visually demonstrate or cross-compare the ability of one or multiple different formulations' ability to extract coloured soils from surfaces. A first cleaning composition is applied as a foam on a coloured stain (i.e., baked on tomato sauce —supplier: Center for Testmaterials, Netherlands—identification code: DP-02). The foam's ability to extract the coloured stain is evaluated through visual assessment of the degree of foam colouration over time, or as a relative degree of foam colouration of the test versus a reference product. The steps for this method with a foaming composition are as follows:

1. 5 mL of the foaming dishwashing product is transferred with a plastic pipette to a 28 mL glass vial (supplier: VWR). The transferred product is manually shaken for one minute at a frequency of about 2.5 shakes per second, to generate a foam. One shake consists of an up and down movement of about 20 cm. The vial is switched hands at 30 seconds, approximately mid-way during the shaking.
2. 2.5 mL of the most dense section of the generated foam is taken from the glass vial and transferred by a plastic pipette to a plate pre-coated with the coloured stain. It is important that only the foam phase is transferred and no liquid phase since the liquid phase can alternate the readings considerably.
3. A timer is started immediately after the foam is applied onto the plate pre-coated with the coloured soil and a first picture is taken at time zero. Subsequent pictures are taken every 30 seconds up to 4 minutes to follow the kinetics of the colouration of the foam.

Comparative test products can also be added as a foam created following the steps as described above, or can be directly added as a liquid, pending the objective of the visual demonstration. For example, when cross-comparing spray products both first and comparative test products will be applied as a foam as described above. When aiming at cross-comparing a spray with a non-spray liquid detergent the demonstrator might prefer to show the first (spray) product through a foam created as above, and the comparative product as a liquid applied directly onto the pre-coated plate with the coloured soil.

Alternatively the first and/or test product might also be directly sprayed on the pre-coated plate from a fixed distance, equal across spray products. The relative degree of colouration of the foam is visually compared for different test products to assess their relative coloured stain removal performance.

EXAMPLE

The following examples are provided to further illustrate the present invention and are not to be construed as limitations of the present invention, as many variations of the present invention are possible without departing from its spirit or scope.

Example 1

Visual Assessment of the Relative Coloured Stain Cleaning Performance

The ability of a cleaning composition to extract coloured stains has been assessed for a strongly performing cleaning composition comprising a low-cut alcohol alkoxylate nonionic surfactant (Composition 1), following the test method described herein. In parallel, a comparative composition is prepared by replacing the low cut alcohol alkoxylate nonionic surfactant with demineralized water (Comparative Composition 1). The foregoing compositions are produced through standard mixing of the components described in Table 3.

TABLE 3

Test Compositions:

| Ingredients | Composition 1 | Comparative Composition 1 |
|---|---|---|
| AES (Tensagex EOC970 ex KLK OLEO) | 6.54% | 6.54% |
| C1214 dimethyl amine oxide | 2.46% | 2.46% |
| Lutensol ® CS6250 ex BASF | 5% | — |
| GLDA chelant ex AKZO | 1% | 1% |
| monoethanolamine | 0.5% | 0.5% |
| sodium bicarbonate | 0.1% | 0.1% |
| PPG 2000 | 0.05% | 0.05% |
| Water and minors (0.25% perfume, preservatives) | Balance to 100% | Balance to 100% |
| pH | 11.4 | 11.4 |

The resultant Composition 1 and Comparative Composition 1 are assessed according to the Coloured Stain Removal Test method, with foams created through manual agitation as described herein. The results of the test are shown in FIG. 2 (at 0, 2 and 4 minutes data points). With reference to FIG. 2, the strongly performing low cut alcohol alkoxylate nonionic surfactant containing formulation (Composition 1) visualizes excellent coloured stain extraction performance, as evidenced by a resulting strongly coloured foam. Very limited coloured stain extraction is observed for the poorly performing Comparative Composition 1, as evidenced by a resulting dominant white coloured foam. As the results show, the demonstration method of the invention allowed to clearly differentiate and visualize the performance potential of 2 differently performing test formulations.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for providing to a consumer a visualization of the effectiveness of coloured stain removal of a cleaning composition on a substrate, the method comprising the steps of:
    (a) providing a first substrate having a first coloured stain, the first substrate being selected from a hard surface or a soft surface;
    (b) treating the first coloured stain on the first substrate with a first cleaning composition formulated to generate a foam on the first coloured stain;
    (c) allowing the generated foam to act on the first coloured stain after the treatment for a first period of time from 5 seconds to 600 seconds;
    (d) allowing the consumer to visually assess effectiveness of coloured stain removal of the first cleaning composition as indicated by a first colour change in the generated foam;
    (e) optionally, rinsing or wiping the generated foam from the first substrate allowing the consumer to visually assess the cleaning efficacy of the first cleaning composition;
    (f) optionally, providing a second substrate having a second coloured stain, wherein the second substrate and the second coloured stain are substantially similar to the first substrate and the first coloured stain;
    (g) treating either a different area on the first coloured stain on the first substrate or the second coloured stain on the second substrate, if present, with a second cleaning composition dispensed from a dispenser;
    (h) allowing the dispensed second cleaning composition to act on the first coloured stain or the second coloured stain, if present, after the treatment for a second period of time from 5 seconds to 600 seconds; and
    (i) allowing the consumer to visually assess effectiveness of coloured stain removal between the first cleaning composition and the second cleaning composition as indicated by a different appearance of the first colour change in the generated foam versus a second colour change in the dispensed second cleaning composition.

2. The method according to claim 1, wherein step (c) allowing the generated foam to act on the first coloured stain after the treatment for a first period of time from 30 to 120 seconds.

3. The method according to claim 1, wherein the effectiveness of the coloured stain removal is determined by visually assessing the different appearance of intensity of the colour change, or distribution of the colour change across the generated foam versus the dispensed second cleaning composition at an equal exposure timepoint.

4. The method according to claim 1, wherein the first coloured stain and the second coloured stain, if present, are cooked-, baked- or burnt-on coloured soil.

5. The method according to claim 4, wherein the first coloured stain and the second coloured stain, if present, are selected from oil, grease, coffee, tea, vegetables, tomatoes, or mixtures thereof.

6. The method according to claim 1, wherein the first colour change and the second colour change, if present, are selected from a white colour to a red colour, from a white colour to an orange colour, from a white colour to a yellow colour, from a white colour to a brown colour, or from a white colour to a black colour.

7. The method according to claim 1, wherein the generated foam from the first cleaning composition comprises a compression force from 1.5 gf*mm to 6 gf*mm.

8. The method according to claim 1, wherein the first cleaning composition comprises i) from 1% to 15% by weight of the total first cleaning composition of a surfactant system and ii) from 1% to 15% by weight of the total first cleaning composition of an active selected from the group consisting of an organic grease cleaning solvent and a linear or branched alcohol alkoxylate non-ionic surfactant with an average alkyl carbon chain length of C10 and below, comprising on average from 3 to 7 alkoxy groups; wherein the surfactant system described under i) excludes the alcohol alkoxylate non-ionic surfactant described under ii).

9. The method according to claim 8, wherein the surfactant system comprises an anionic surfactant, and a co-surfactant selected from the group consisting of amphoteric surfactant, zwitterionic surfactant and mixtures thereof.

10. The method according to claim 9 wherein the anionic surfactant is an alkyl ethoxylated sulfate anionic surfactant having an average degree of ethoxylation of from 0.5 to 5.

11. The method according to claim 8, wherein the organic grease cleaning solvent is selected from the group consisting of:
    (a) a glycol ether solvent selected from the group consisting of glycol ethers of Formula (I): R1O(R2O)nR3, Formula (II): R4O(R5O)nR6, and mixtures thereof; wherein:
        R1 is a linear or branched C4, C5 or C6 alkyl or a substituted or unsubstituted phenyl;
        R2 is ethyl or isopropyl;
        R3 is hydrogen or methyl, and n is 1, 2 or 3;
        R4 is n-propyl or isopropyl;
        R5 is isopropyl; and
        R6 is hydrogen or methyl and n is 1, 2 or 3;
    (b) an ester selected from the group consisting of:
        i) monoesters of the Formula (III): R7C=OOR8, wherein:
            R7 is a linear or branched C1 to C4 alkyl; and
            C8 is a linear or branched C2 to C8 alkyl;
        ii) di- or tri-esters having the Formula (IV): R9(C=OOR10), wherein:
            R9 is a saturated or unsaturated C2 to C4 alkyl;
            R10 is independently selected from a linear or branched C2 to C8 alkyl; and
            n is 2 or 3;
        iii) benzylbenzoate; and
        iv) mixtures thereof;
    (c) an alcohol selected from the group consisting of C4-C6 linear mono-alcohols, branched C4-C10 mono-alcohols having one or more C1-C4 branching groups, alkyl mono-glycerols, and mixtures thereof; and
    (d) mixtures thereof;
        wherein the surfactant system and the organic grease cleaning solvent selected from (a), (b), (c) and (d) are in a weight ratio of from 5:1 to 1:5.

12. The method according to claim 1, wherein the first cleaning composition has a pH range of from 7 to 14, as measured neat at 20° C.

13. A method for providing to a consumer a visualization of the effectiveness of coloured stain removal of a cleaning composition on a substrate, the method comprising the steps of:
    (a) providing a first substrate having a first coloured stain, the first substrate being selected from a hard surface or a soft surface;

(b) treating the first coloured stain on the first substrate with a first cleaning composition formulated to generate a foam on the first coloured stain;

(c) allowing the generated foam to act on the first coloured stain after the treatment for a first period of time from 5 seconds to 600 seconds;

(d) allowing the consumer to visually assess effectiveness of coloured stain removal of the first cleaning composition as indicated by a first colour change in the generated foam;

(e) optionally, rinsing or wiping the generated foam from the first substrate allowing the consumer to visually assess the cleaning efficacy of the first cleaning composition;

(f) optionally, providing a second substrate having a second coloured stain, wherein the second substrate and the second coloured stain are substantially similar to the first substrate and the first coloured stain;

(f) treating either a different area on the first coloured stain on the first substrate or the second coloured stain on the second substrate, if present, with a second cleaning composition dispensed from a dispenser;

(g) allowing the dispensed second cleaning composition to act on the first coloured stain or the second coloured stain, if present, after the treatment for a second period of time until the dispensed second cleaning composition is substantially similar in appearance to the colour change in the generated foam and recording the duration of the second period of time; and (h) allowing the consumer to visually assess effectiveness of coloured stain removal between the first cleaning composition and the second cleaning composition as indicated by a difference in the duration of the first period of time versus the second period of time.

* * * * *